United States Patent [19]

Love

[11] Patent Number: 5,385,373
[45] Date of Patent: Jan. 31, 1995

[54] TAMPER-EVIDENT, SELF-LOCKING COVER FOR MECHANICAL CONNECTIONS AND RELATED OBJECTS

[75] Inventor: Vaughn R. Love, Columbus, Ind.

[73] Assignee: Cummins Engine Company, Inc., Columbus, Ind.

[21] Appl. No.: 34,284

[22] Filed: Mar. 22, 1993

[51] Int. Cl.[6] .............................................. A47C 3/00
[52] U.S. Cl. .................... 292/307 B; 403/313; 403/344; 24/487; 24/16 PB
[58] Field of Search ............... 292/307 B, 307 R; 403/313, 309, 344, 289; 24/487, 16 PB, 17 AP

[56] References Cited

U.S. PATENT DOCUMENTS

| | | | |
|---|---|---|---|
| 945,106 | 1/1910 | Moodey | 403/344 |
| 4,176,756 | 12/1979 | Gellman | 403/309 X |
| 4,286,640 | 9/1981 | Knox et al. | 292/307 B X |
| 4,326,740 | 4/1982 | Guiler . | |
| 4,372,593 | 2/1983 | Kesselman . | |
| 4,405,161 | 9/1983 | Young et al. . | |
| 4,471,982 | 9/1984 | Nielsen, Jr. . | |
| 4,478,381 | 10/1984 | Pittion et al. | 24/487 X |
| 4,552,394 | 11/1985 | Kesselman . | |
| 4,600,220 | 7/1986 | Agnelli . | |
| 4,664,432 | 5/1987 | Swift . | |
| 5,048,881 | 9/1991 | Renfro | 292/307 B X |
| 5,115,542 | 5/1992 | Gehres | 24/487 X |
| 5,277,387 | 1/1994 | Lewis et al. | 24/487 X |

FOREIGN PATENT DOCUMENTS 2130147  5/1984  United Kingdom ............ 292/307 B

*Primary Examiner*—Peter M. Cuomo
*Assistant Examiner*—Jerry Redman
*Attorney, Agent, or Firm*—James M. Durlacher

[57] ABSTRACT

A tamper-evident, self-locking cover for mechanical and electrical connections includes a unitary, molded plastic member including two generally semi-cylindrical pockets connected by a first living hinge and including snap-fit, self-locking, tamper-evident means of connection. Integrally therewith and extending from one pocket half are a pair of generally cylindrical receptacles arranged so as to provide three gripping fingers. Integrally therewith and extending from the other enclosing portion are a pair of stem members which are initially oriented in a non-engaging orientation and which are connected by means of a second living hinge. As the enclosing portions are flexed and closed around the object to be encased and protected, the stem members are flexed into a controlled engaging orientation so as to be brought into alignment with the female receptacles. Once the two stem members are inserted into the receptacles, the receptacle fingers grip the back portion of the frustoconical head of each stem preventing disassembly or disconnection without damaging or destroying one or more of the self-locking components. The locking components are covered by an extension of one of the two molded pockets preventing access to release the locking fingers.

20 Claims, 3 Drawing Sheets

TAMPER-EVIDENT, SELF-LOCKING COVER FOR MECHANICAL CONNECTIONS AND RELATED OBJECTS

BACKGROUND OF THE INVENTION

The present invention relates in general to tamper-evident enclosures which are intended to enclose a connection or object so as to prevent tampering with that connection or object or at least provide a visual indication of any tampering attempt. More specifically the present invention pertains to a unitary, molded plastic, tamper-evident clam-shell cover which has a self-locking feature and which utilizes living hinges.

In a variety of industrial situations there is a desire if not a need to maintain the integrity of a seal, connection, fitting, valve, joint, etc. It may be important to know that a particular connection has not been tampered with, such as loosening a mechanical or electrical connection or opening a flow line. Tamper-evident covers may be used to discourage thefts as well as tampering attempts. Even if a tampering attempt is successful, the tamper-evident feature puts the end user on notice of such an attempt which may ultimately prevent a more serious problem from occurring. If the user is alerted to a tampering attempt, whether successful or not, then steps can be taken by the user to check the connection and verify whether or not the attempt was successful.

Some typical situations which may benefit from tamper-evident covers of tile type being generally discussed herein include a seal (cover) for a gas meter coupling nut, a seal for a pipe coupling and a cover for wellhead distribution valving. Examples of these and related situations which may benefit from tamper-evident cover are described and illustrated by the following listed patent references:

| Patent No. | Patentee | Issue Date |
| --- | --- | --- |
| 4,326,740 | Guiler | Apr. 27, 1982 |
| 4,372,593 | Kesselman | Feb. 8, 1983 |
| 4,405,161 | Young et al. | Sep. 20, 1983 |
| 4,471,982 | Nielsen, Jr. | Sep. 18, 1984 |
| 4,552,394 | Kesselman | Nov. 12, 1985 |
| 4,600,220 | Agnelli | Jul. 15, 1986 |
| 4,664,432 | Swift | May 12, 1987 |

The tamper-evident, self-locking cover of the present invention is designed primarily for mechanical and electrical connections. These types of connections may include hydraulic as well as pneumatic lines and plumbing fittings. The electrical connections may take on a variety of shapes and uses. Structurally the type of situation which lends itself to being protected by the present invention is where a larger control member or connection is assembled to at least one, but often two smaller incoming lines, conduits or pipes. These incoming lines, conduits, or pipes may connect to the central member from the same side or from opposite sides. And as will be explained hereinafter, the specific design of the self-locking cover of the present invention contemplates such variations.

The cover of the present invention is designed with living hinges which close the two clam shell halves around the smaller lines on either or both sides of the larger central member and completely encases the central member. By means of a snap-fit, self-locking structure utilizing a tamper-evident technique, it is not thereafter possible to gain access to the larger central member or to the points of connection to the incoming lines, conduits or pipes, whatever this larger central member might be, without damaging the cover or fracturing some portion of the cover or the snap-fit assembly which would thus reveal a tampering attempt.

While the cover of the present invention could simply be destroyed and thereby permit access to the central member, mere access is generally not the issue. If the end user understands that the connection, object or central member has been tampered with or vandalized, appropriate steps can be taken to investigate the matter and correct the problem before utilizing that central member in a way that could cause more serious damage or injury. The issue here is not a matter of the end user being able to deal with the problem of vandalism or other damage after it has occurred. The issue is being able to determine in advance whether or not vandalism, tampering or sabotage has occurred or may have occurred. If the cover has been destroyed, early detection is a certainty. If the proper end user is aware of a tampering attempt then steps can be taken to check the connection (central member) and see if everything is in order and if not, provide the necessary repairs or replacement of damaged or removed parts.

SUMMARY OF THE INVENTION

A tamper-evident cover for enclosing an object according to one embodiment of the present invention comprises a pair of semi-cylindrical shell halves which are hingedly joined together, a female receptacle outwardly extending from a first one of the shell halves, a male stem in a non-engaging orientation outwardly extending from a second one of the shell halves, hinge means connecting the male stem with the second one of the shell halves for allowing the orientation of the male stem to be changed to an engaging orientation and the male stem in the engaging orientation being in axial alignment with the female receptacle when the pair of semi-cylindrical shell halves are closed together.

One object of the present invention is to provide an improved tamper-evident cover for mechanical and electrical connections and objects.

Related objects and advantages of the present invention will be apparent from the following description.

DESCRIPTION OF THE PREFERRED EMBODIMENT

Figure 1:
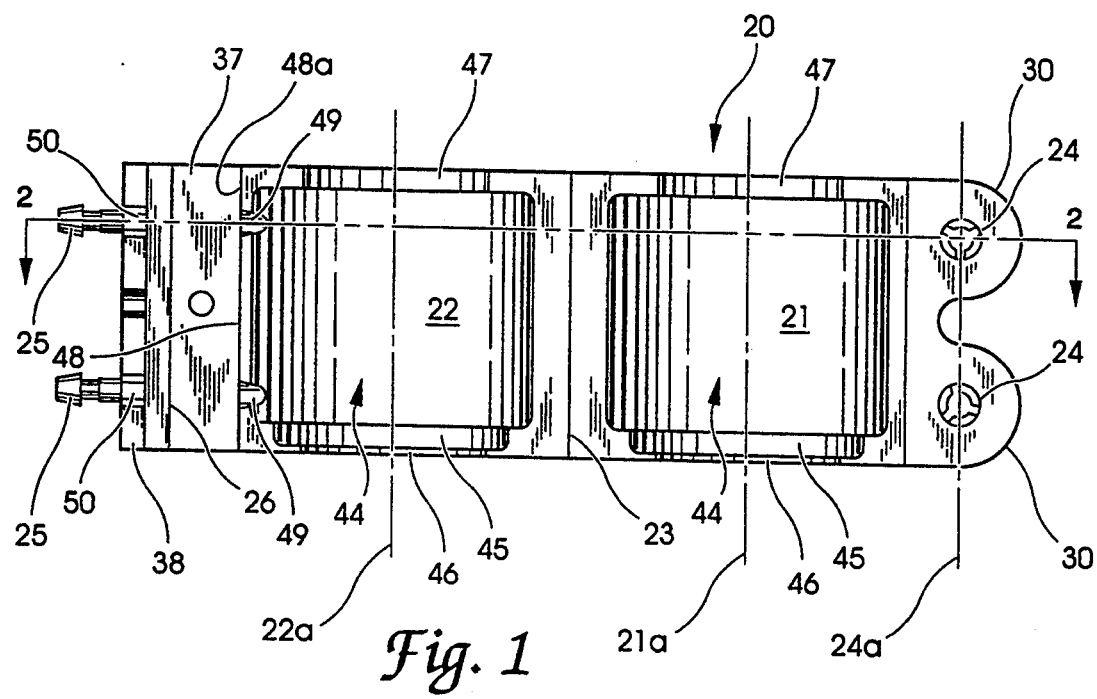
FIG. 1 is a top plan view of a unitary molded cover in an open condition according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
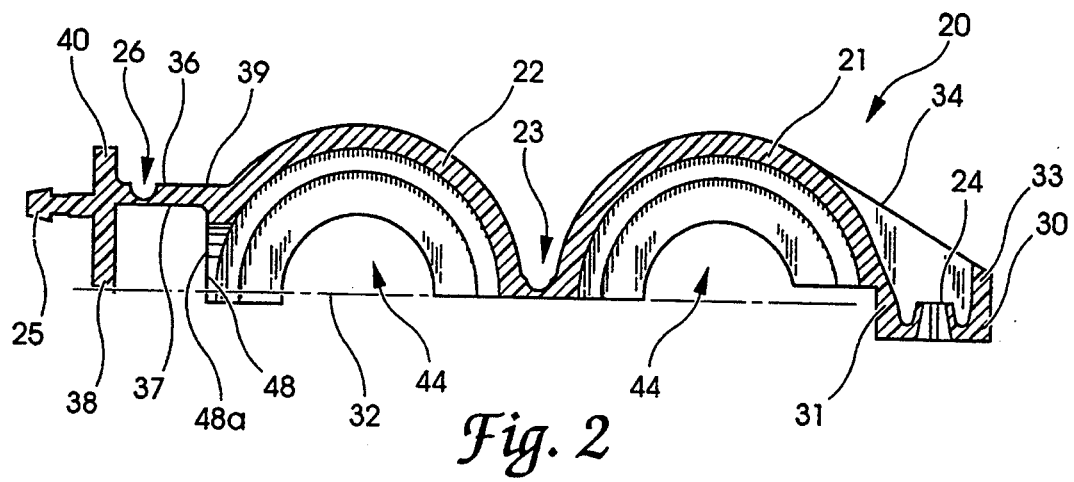
FIG. 2 is an end elevational view in full section of the FIG. 1 cover as viewed along line 2—2 in FIG. 1.
Figure 3:
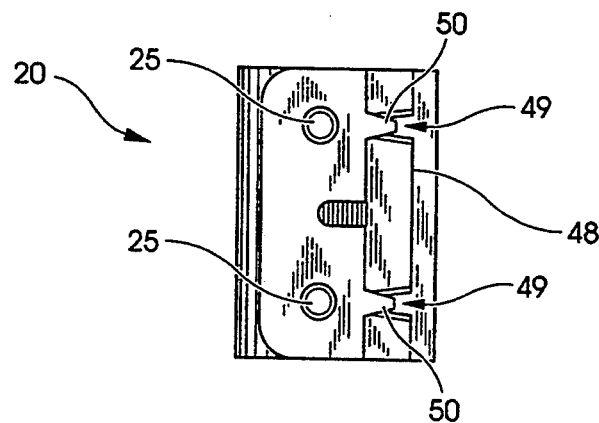
FIG. 3 is a side elevational view of the FIG. 1 cover as projected based upon the FIG. 1 orientation.

Referring to FIGS. 1, 2 and 3 there is illustrated a single-piece (unitary) molded plastic cover 20 which is designed and manufactured in accordance with the present invention. Cover 20 is designed to be self-locking and is provided with a snap-fit assembly which provides a tamper-evident feature to cover 20 and these aspects will be described in greater detail hereinafter.

Cover 20, although a one-piece, molded plastic member can be viewed or thought of as having six portions or sections. These six portions include semi-cylindrical shell half 21, semi-cylindrical shell half 22, a first living hinge 23, a pair of side-by-side frustoconical female receptacles 24, a pair of side-by-side frustoconical male stems 25 and a second living hinge 26. A suitable material for cover 20 is DUPONT ZYTEL 6/6 Nylon-ST801 HS.

As is illustrated, each of the two female receptacles 24 are molded into and defined by a corresponding boss 30. Each boss 30 is an integral extension of the outer wall of shell half 21, connected to the outer wall by raised wall portion 31. The two receptacles are centered on a centerline 24a which is parallel to shell half centerlines 21a and 22a. As will be apparent later with reference to other drawing figures, wall portion 31 extends above or beyond the geometric centerline 32 which is the separating line defining the semi cylindrical edge or closing line for shell halves 21 and 22. Each outer wall portion 33 forms in part and extends down from its corresponding boss 30 and has a part-cylindrical shape in the areas surrounding each of the two female receptacles 24. The surrounding boss 30 for each receptacle 24 is cut along edge 34 which connects to the outer wall of shell half 21. The length of wall portion 33 is sufficient to prevent access to receptacle 24 after stem 25 is inserted and locked.

Shell halves 21 and 22 are integrally connected by the first living hinge 23 and this permits these two shell halves to be closed one onto the other so as to create an enclosing or encasing structure. As the two semi-cylindrical halves flex and close together they create a generally cylindrical enclosure or circumferential cover. Retaining the two shell halves in this closed condition is achieved by a male-female, snap-fit interlocking assembly using female receptacles 24 and the male stems 25. As should be understood, the two male stems have a lateral spacing which is virtually identical to the lateral spacing between the two female receptacles. However, as initially molded, the two male stems have a non-engaging orientation as they extend laterally out and away from the second shell half 22. Mold design efficiencies are provided by extending the two stems and their supporting walls and extensions in this manner. The mold parting line on this side of cover 20 cuts through the center of stems 25.

In order to orient the two male stems 25 in a condition and direction for engaging two female receptacles when the shell halves 21 and 22 are closed together, it is necessary to bend the stems down and the point of flexing or bending is along the longitudinal centerline of the second living hinge 26. By bending the two stems 25 in this manner their spacing from the outer cylindrical wall of shell half 22 is virtually the same as the spacing of receptacles 24 from the outer semi-cylindrical wall of shell half 21. When the two shell halves are closed together the two stems are brought into alignment with the centers of the two receptacles.

Although it may be questioned as to the need for the second living hinge 26, it would not be as economical, if even possible, to design a mold which fixes the two stems 25 in an engaging orientation as molded. It is a novel improvement in the mold design to extend the stems horizontally and then use a living hinge to change the orientation from non-engaging to engaging.

The two stems 25 are integrally molded as part of shelf extension 36 which also includes the second living hinge 26. The shelf extension 36 is integrally molded as part of shell half 22. Extending in a direction which is substantially normal to the top surface 37 of shelf extension 36 is inner wall portion 38. Extending in a direction which is substantially normal to the lower surface 39 of shell extension 36 is outer wall portion 40. The two wall portions 38 and 40 are of generally the same width and are generally in alignment with each other. The references to "top" and "lower" and to "inner" and "outer" relate to the orientation of FIG. 1 and the final or assembled orientation of the shelf extension and the wall portions.

When the two shell halves 21 and 22 are closed together and the male stems 25 and female receptacles 24 are snapped together, the cover 20 assumes an enclosing and locked condition and one which cannot be opened or separated without that effort being revealed. Any attempt to disconnect the stems 25 from the receptacles 24 would be evident since the only way for these two components to be disconnected is to structurally alter or destroy one or both portions of this snap-fit assembly and thus such a tampering attempt would be apparent through visual inspection.

Each shell half 21 and 22 is similarly shaped and contoured with a central, semi-cylindrical pocket 44, an outer semi-cylindrical clearance portion 45 and oppositely-disposed semi-cylindrical clearance apertures 46 and 47. So long as the object to be encased or enclosed by cover 20 is larger than apertures 46 and 47, the closed and locked cover 20 will not be able to be removed by sliding it, presumably in either direction, over or off of the enclosed object. The specific size and shape of pockets 44 and portions 45 will depend on the size and shape of the object to be enclosed by the cover. It should also be understood that shell halves 21 and 22 are virtually identical to each other though this likewise would not necessarily have to be the case. If the main object to be encased does not have a somewhat symmetrical geometry, the two shell halves will be sized and shaped differently so as to approximate the main object. It is envisioned that depending upon this specific size, shape and geometry of the object to be enclosed or encased that the two shell halves will be configured to closely conform so as to control the size and economize on material. For objects which are symmetrical or near symmetrical, the two shell halves 21 and 22 would likewise be virtually identical to each other.

It should be understood that if the object being enclosed is such that only one line or connection runs to it, only one clearance aperture 46 or 47 in each shell half would be needed. Likewise, portion 45 may be disposed on each end of pocket 44 or may be removed from each end entirely. Ideally the design of cover 20 depends on the size, shape and nature of what is enclosed, but it is also envisioned that more generic covers can be provided according to the present invention. The only real requirements are that the cover be able to enclose the object with a snap-fit, self-locking, tamper-evident means and that it be unable to be pulled or pried off without leaving some indication of a tampering attempt.

Figure 4:
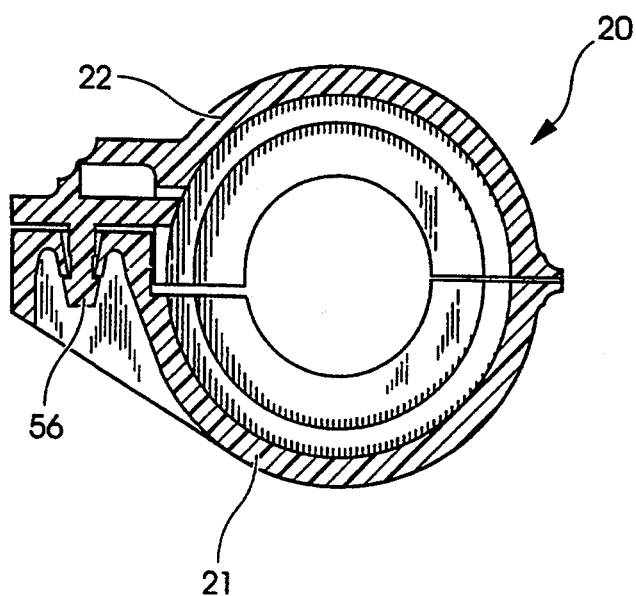
FIG. 4 is an end elevational view in full section of the FIG. 1 cover in a closed condition.
Figure 5:
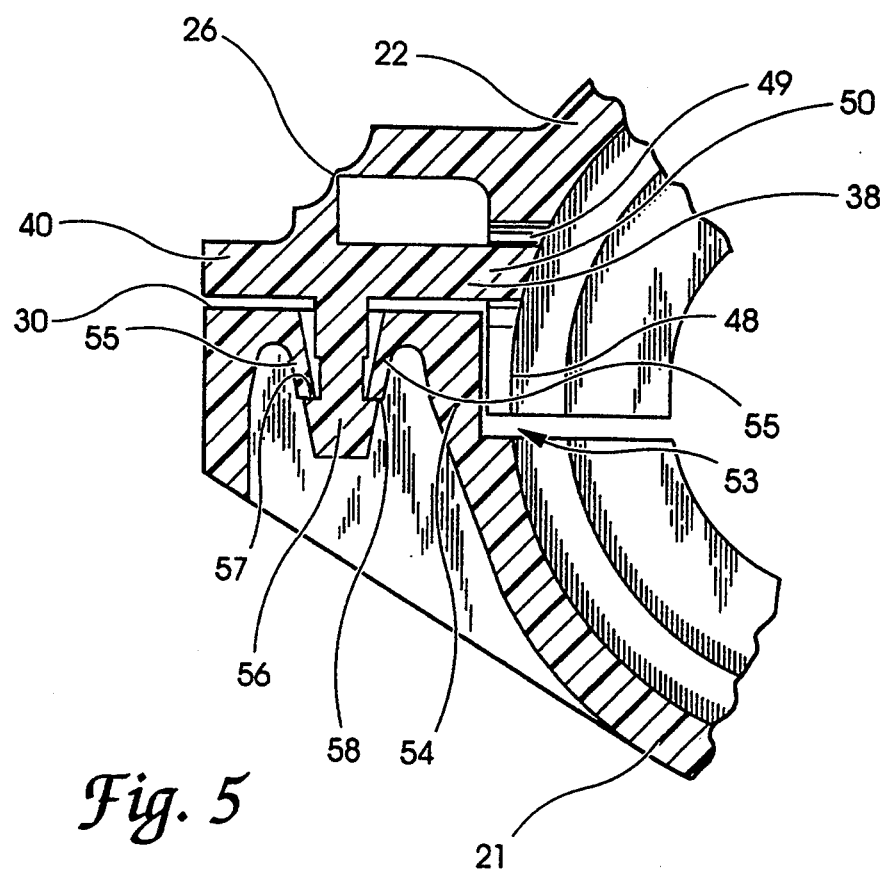
FIG. 5 is a partial enlarged view of the snap-fit assembly portion of the FIG. 4 closed cover.

The outer edge portion 48 of the wall of shell half 22 is shaped so as to have a flat outer surface 48a and thus a reduced wall thickness compared to the remainder of the shell half wall. This thinner section is notched with two slots 49 which have a relative narrow width and a depth ending just short of surface 37. As will be described relative to FIGS. 4 and 5, inner wall portion 38 includes two, spaced-apart tabs 50 which are aligned with the two slots 49. The alignment of tabs 50 relative to slots 49 is illustrated in FIG. 3 and the interfit of the tabs 50 and slots 49 is illustrated in FIGS. 4 and 5. This interfit serves to position stem 25 and hold it nearly normal to receptacle 24.

Referring to FIGS. 4 and 5, cover 20 is illustrated in a closed condition as it would be when closed around the object to be protected. As shown, the second living hinge 26 is bent so as to orient the inner wall portion 38 and the outer wall portion 40 directly over and substantially parallel with the top surface of the two bosses 30. The two tabs 50 which are an extension of inner wall portion 38 are inserted into slots 49 to stop the bending motion. Leading edge 48 of shell half 22 is inset relative to shell half 21 into a relief area 53 and overlaps relief area wall 54. Although FIGS. 4 and 5 are illustrated as full section views showing the interlock of one stem 25 into one receptacle 24, it is to be understood that the other stem 25 and the other receptacle 24 are assembled in a virtually identical manner.

Each receptable 24 has a frustoconical shape and each is formed by three, closely-spaced, finger-like sections 55 extending in a converging manner down through the corresponding boss 30.

The finger sections 55 of each receptacle 24 are able to flex and receive the frustoconical head 56 of the corresponding stem 25. The flat rear surface 57 of head 56 abuts up against edges 58 of the receptacle finger sections 55 thereby preventing disassembly (i.e., opening of the enclosed cover) without revealing any such tampering attempt. While it would be possible to destroy the cover 20, it is not possible to defeat the cover and tamper with the enclosed object or the connections to that object without leaving some evidence of the tampering attempt. This evidence may be in the form of a cut, broken or fractured hinge 26, a cut, broken or fractured receptacle finger section 55 or a cut, broken or fractured stemhead 56. Any of these would be readily apparent to visual examination and would alert the user to a tampering attempt and to the possibility that such an attempt was successful.

Figure 6:
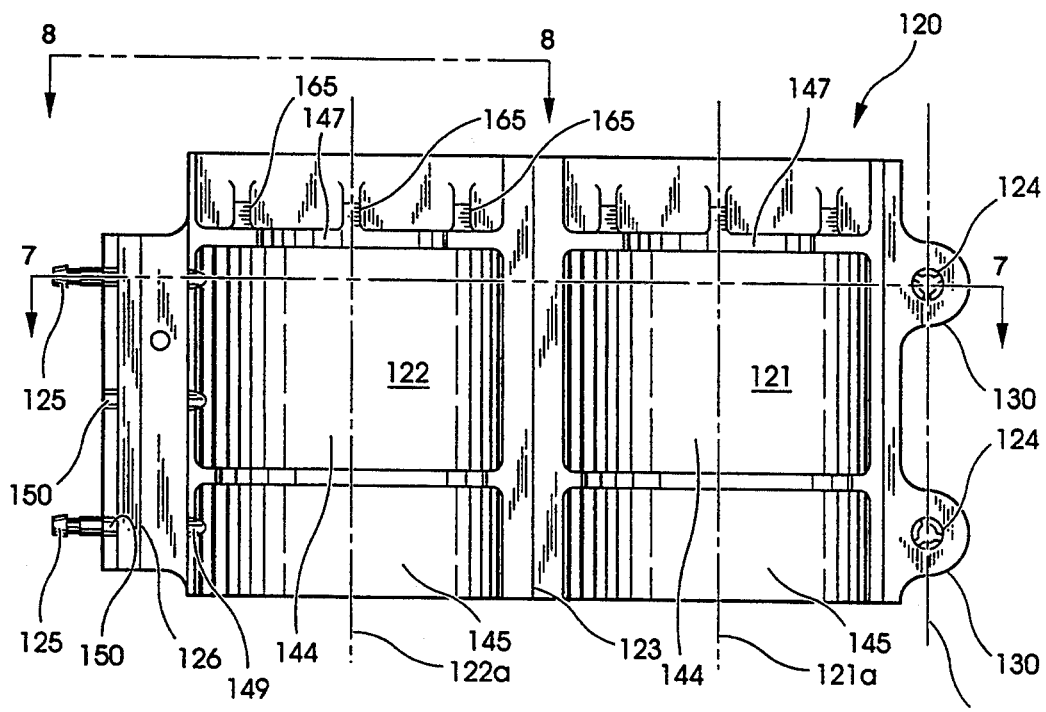
FIG. 6 is a top plan view of a unitary molded cover in an open condition according to a typical embodiment of the present invention.
Figure 7:
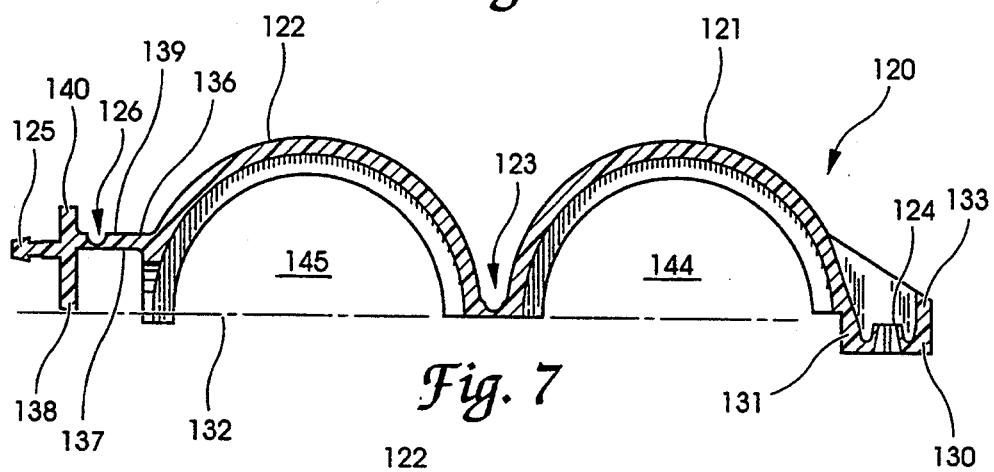
FIG. 7 is an end elevational view in full section of the FIG. 6 cover as viewed along line 7—7 in FIG. 6.

As previously mentioned and described, it is possible to modify the size, shape and configuration of the shell halves (21 and 22 in FIG. 1) in order to accommodate different objects and different connections. Referring to FIGS. 6 and 7 another cover 120 according to the present invention is illustrated. While the general construction and function of cover 120 as illustrated in FIGS. 6 and 7 is virtually the same as cover 20 there are various structural differences, each of which should be visually discernable by a careful review and comparison of FIGS. 1 and 2 relative to FIGS. 6 and 7. It will also be noted that a 100 number prefix has been used for the reference numerals of FIGS. 1 through 3 for the like or similar structural features in drawing FIGS. 6 and 7. Similar in most respects to cover 20, cover 120 is a one-piece, molded plastic member which can be viewed or thought of as having six portions or sections. These six portions include semi-cylindrical shell half 121, semi-cylindrical shell half 122, a first living hinge 123, a pair of side-by-side frustoconical female receptacles 124, a pair of side-by-side frustoconical male stems 125 and a second living hinge 126. Each of the two female receptacles 124 are molded into and defined by a corresponding boss 130. Each boss 130 is an integral extension of the outer wall of shell half 121, connected to the outer wall by raised wall portion 131. Female receptacles 124, similar to receptacles 24, are centered on a centerline 124a which is parallel to the shell half centerlines 121a and 122a. As with FIGS. 1 and 2 with regard to cover 20, wall portion 131 of cover 120 extends above or beyond the geometric centerline 132 which is the separating line defining the semi-cylindrical edge or closing line for shell halves 121 and 122. Additionally, cover 120 includes outer wall portions 133, shelf extension 136, top surface 137, inner wall portion 138, lower surface 139 and outer wall portion 140. As indicated, each of these portions of cover 120 are virtually the same in form, fit and function with their corresponding or counterpart portion with regard to cover 20.

In addition to the minor structural differences between covers 20 and 120 in the area of the female receptacles 24 and 124 and bosses 30 and 130, the differences in the configuration of pockets 144, portions 145 and apertures 147 are more significant. Here again, a careful review and comparison of the drawing figures relating to cover 20 and those drawing figures relating to cover 120 will make the structural differences visually apparent.

In FIG. 1 the centerline to centerline dimension from one shell half to the other shell half (the distance between lines 21a and 22a) is approximately 0.88 inches. In FIG. 6 this corresponding centerline to centerline dimension is approximately 1.21 inches. The length dimension (measured parallel to the shell half centerlines) from one end to the other end of cover 20 is approximately 0.67 inches and of cover 120 this distance is approximately 1.43 inches. The resultant size comparison between cover 20 and cover 120 points out that generally the same features of each cover can be maintained while significantly increasing the overall size. A size increase or a size decrease is contemplated within the teachings of the present invention in order to configure the corresponding cover to fit over and around the object to be enclosed. As previously mentioned, either cover 20 or 120 according to the present invention could be oversized so as to fit not only the intended object but objects which are much larger. Along these lines there may be some desire to make the size and shape of the two shell halves more generic. The trade off consideration is the size which may be far in access of what is needed for encasing the particular object and the corresponding cost in molds and wasted or excess material. The trade off in the other direction where the shell halves would be more customized to the particular object to be enclosed is the need for a larger number of special molds and a larger number of specialized cover designs to be inventoried.

Figure 8:
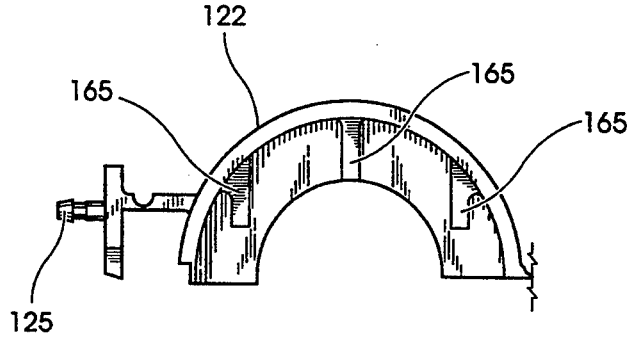
FIG. 8 is a partial, end elevational view of the FIG. 6 cover as viewed along line 8—8 in FIG. 6.

A further feature of cover 120 which can be thought of as resulting from the size increase over that of cover 20 is the addition of one more slot and tab interfit. As illustrated, in cover 120 there are three slots 149 and three interfitting tabs 150. Additionally, one end of each shell half 121 and 122 is formed with three stiffening ribs 165 (see FIG. 8).

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tamper-evident cover for enclosing an object comprises:
    a pair of semi-cylindrical shell halves hingedly joined together;
    a female receptacle outwardly extending from a first one of said pair of shell halves;
    a male stem in a non-engaging orientation, outwardly extending from a second one of said pair of shell halves;
    hinge means connecting said male stem with said second one of said pair of shell halves for allowing the orientation of said male stem to be changed to an engaging orientation; and
    said male stem in said engaging orientation being in axial alignment with said female receptacle when said pair of shell halves are closed together.

2. The tamper-evident cover of claim 1 which further includes a second female receptacle and an engaging second male stem.

3. The tamper-evident cover of claim 2 wherein said two female receptacles are positioned in side-by-side alignment with each other on a line parallel to the geometric axis of said pair of semi-cylindrical shell halves.

4. The tamper-evident cover of claim 3 wherein said second male stem is arranged parallel to the other male stem and is hinged to said second one of said pair of shell halves by said hinge means.

5. The tamper-evident cover of claim 4 wherein said two male stems are positioned side-by-side and arranged to be received by said two female receptacles when hinged into an engaging orientation.

6. The tamper-evident cover of claim 5 wherein said cover is constructed out of a molded plastic material as a unitary member.

7. The tamper-evident cover of claim 6 wherein each of said pair of male stems have a frustoconical head.

8. The tamper-evident cover of claim 2 wherein said pair of female receptacles are similarly configured, each with three gripping fingers.

9. The tamper-evident cover of claim 1 wherein each shell half has a generally cylindrical central clearance region and an end-exit, semi-cylindrical aperture which has a diameter size smaller than the diameter size of the central clearance region.

10. The tamper-evident cover of claim 9 which further includes a second female receptacle and a second male stem.

11. The tamper-evident cover of claim 10 wherein said two female receptacles are positioned in side-by-side alignment with each other on a line parallel to the geometric axis of said pair of semi-cylindrical shell halves.

12. The tamper-evident cover of claim 11 wherein said second male stem is arranged parallel to the other male stem and is hinged to said second one of said pair of shell halves by said hinge means.

13. The tamper-evident cover of claim 12 wherein said two male stems are positioned side-by-side and arranged to be received by said two female receptacles when hinged into an engaging orientation.

14. The tamper-evident cover of claim 13 wherein said cover is constructed out of a molded plastic material as a unitary member.

15. The tamper-evident cover of claim 1 wherein said cover is constructed out of a molded plastic material as a unitary member.

16. A molded, unitary, snap-fit enclosing cover for placement around an object to be protected comprises:
    top and bottom enclosing portions which are hingedly joined together and moveable into an enclosing form;
    female snap-fit means extending from said bottom enclosing portion for providing one part of a two-part snap-fit assembly;
    male snap-fit means extending from said top enclosing portion for providing the second part of snap-fit assembly; and
    a living hinge disposed between said male snap-fit means and said top enclosing portion for changing the orientation of said male snap-fit means from an non-engaging orientation to an engaging orientation.

17. The snap-fit enclosing cover of claim 16 wherein said female snap-fit means includes a pair of side-by-side female receptacles.

18. The snap-fit enclosing cover of claim 17 wherein said male snap-fit means includes a pair of side-by-side male stem members.

19. The snap-fit enclosing cover of claim 18 wherein said male stem members are moved into alignment with the female receptacles when hinged into an engaging orientation.

20. The snap-fit enclosing cover of claim 19 wherein each enclosing portion has a generally semi-cylindrical central clearance region and an end-exit, semi-cylindrical aperture which has a diameter sized smaller than the diameter size of the central clearance region.

* * * * *

UNITED STATES PATENT AND TRADEMARK OFFICE
CERTIFICATE OF CORRECTION

PATENT NO. : 5,385,373

DATED : January 31, 1995

INVENTOR(S) : Vaughn R. Love

It is certified that error appears in the above-identified patent and that said Letters Patent is hereby corrected as shown below:

In Col. 1, at line 31, please replace "tile" with --the--.

In Col. 8, at line 41, please replace "an" with --a--.

Signed and Sealed this

Fourth Day of July, 1995

Attest:

BRUCE LEHMAN

Attesting Officer

Commissioner of Patents and Trademarks